United States Patent
Bommer et al.

(10) Patent No.: US 8,510,065 B2
(45) Date of Patent: Aug. 13, 2013

(54) WIRELESS LIQUID QUANTITY MEASUREMENT SYSTEM

(75) Inventors: Jason P. Bommer, Tacoma, WA (US); James P. Irwin, Renton, WA (US); Andrew M. Robb, Ravensdale, WA (US); Wayne Cooper, Tacoma, WA (US); Dennis M. Lewis, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 174 days.

(21) Appl. No.: 12/970,664

(22) Filed: Dec. 16, 2010

(65) Prior Publication Data

US 2012/0158321 A1 Jun. 21, 2012

(51) Int. Cl.
*G06F 19/00* (2011.01)
*G01F 23/00* (2006.01)

(52) U.S. Cl.
USPC .......................................... 702/55; 73/304 R

(58) Field of Classification Search
USPC ................. 702/55, 50, 81, 84, 127, 182–183, 702/188–189; 73/291, 293, 290 R, 304 C, 73/304 R, 427
See application file for complete search history.

(56) References Cited

U.S. PATENT DOCUMENTS

| 3,447,374 | A | 6/1969 | Cohn et al. | |
|---|---|---|---|---|
| 5,022,263 | A | 6/1991 | Uriu et al. | |
| 5,723,870 | A * | 3/1998 | Crowne et al. | 250/577 |
| 2005/0052314 | A1 | 3/2005 | Spanke et al. | |
| 2007/0101809 | A1 | 5/2007 | Roesner | |
| 2008/0074309 | A1 | 3/2008 | Milsson | |
| 2011/0246100 | A1 * | 10/2011 | Carvalho et al. | 702/50 |

FOREIGN PATENT DOCUMENTS

| DE | 4419462 A1 | 12/1995 |
|---|---|---|
| EP | 2166321 A2 | 3/2010 |
| FR | 2739929 A1 | 4/1997 |
| GB | 2342995 A | 4/2000 |

OTHER PUBLICATIONS

Pelczar et al., Contactless Liquid Level Sensing Using Wave Damping Phenomena in Free-Space, 2007 IEEE, The 14th International Conference on Solid-State Sensors, Actuators and Microsystems, Lyon, France, pp. 2353-2356.*
International Search Report & Written Opinion dated Oct. 1, 2012 in PCT Application No. PCT/US11/61078.

* cited by examiner

*Primary Examiner* — Toan Le
(74) *Attorney, Agent, or Firm* — Hope Baldauff, LLC

(57) ABSTRACT

Technologies are described herein for wirelessly measuring liquid quantity in an enclosure. According to various aspects, an incident electromagnetic wave is transmitted within a conductive enclosure. One or more rebound electromagnetic waves that correspond to the incident electromagnetic wave are received. Using the rebound electromagnetic waves, a transfer function of the rebound electromagnetic waves is measured and a quantity of liquid stored in the enclosure is calculated based on the measured transfer function.

18 Claims, 5 Drawing Sheets

WIRELESS LIQUID QUANTITY MEASUREMENT SYSTEM

BACKGROUND

In typical aircraft, the amount of fuel stored in the fuel tank of the aircraft is measured using multiple wired capacitive probes that are immersed within the fuel tank. Each capacitive probe is coupled to a wire that extends from the top of the probe and travels some distance within the fuel tank before exiting the fuel tank through a bulkhead. The portion of wire within the fuel tank is of key concern as it may provide an entrance pathway for lightning currents.

To reduce the risk of lightning currents entering the fuel tank through the wire coupled to a capacitive probe, various safety-related electrical circuits and components are used. However, these safety-related circuits and components add weight to the aircraft, which conflicts with the perpetual goal in the aerospace industry to reduce aircraft weight. In addition, there are additional costs associated with the installation, maintenance and inspection of these components.

It is with respect to these and other considerations that the disclosure made herein is presented.

SUMMARY

Technologies are described herein for wirelessly measuring liquid quantity in an enclosure. Through the utilization of the technologies and concepts presented herein, the quantity of liquid contained in an enclosure may be measured wirelessly using electromagnetic waves. The technologies may be utilized to wirelessly measure the quantity of fuel stored in a fuel tank of an aircraft using electromagnetic waves. In this manner, no wires extend within the fuel tank, thereby eliminating the risk of a lightning current entering the fuel tank. As a result, overall aircraft safety can be improved.

According to various aspects, a method for measuring liquid quantity is disclosed herein. An incident electromagnetic wave is transmitted within a conductive enclosure. One or more rebound electromagnetic waves that correspond to the incident electromagnetic wave are received. A transfer function corresponding to the rebound electromagnetic waves is measured and a quantity of liquid stored in the enclosure is calculated based on the measured transfer function. In some embodiments, the transfer function may be correlated to the time delay between the transmitting an incident electromagnetic wave and receiving a reflected electromagnetic wave corresponding to the incident electromagnetic wave. Further, the transfer function may be geometry specific. What this means is that the transfer function corresponding to the rebound electromagnetic waves may vary based on the depth of the liquid and the distances between the air/liquid boundary and the transmitter and receiver, respectively.

According to further aspects, a wireless liquid quantity measuring system includes a conductive enclosure configured to store a liquid. A transmitter transmits incident electromagnetic waves within the conductive enclosure and a receiver receives rebound electromagnetic waves corresponding to the incident electromagnetic waves. A transfer function module measures a transfer function corresponding to the rebound electromagnetic waves and a liquid quantity calculating module utilizes the measured transfer function to calculate liquid quantity. According to embodiments, the liquid quantity is calculated by matching the measured transfer function to a set of known transfer functions having corresponding liquid quantities. The set of known transfer functions may be determined during a calibration process.

According to further aspects, a system for measuring liquid quantity includes a conductive enclosure configured to store a liquid. The conductive enclosure has an outer surface and an inner surface separated by a conductive barrier. An outer inductive coil is positioned on the outer surface and receives power from a liquid quantity measurement controller. An inner inductive coil is positioned in such a manner that the outer inductive coil and the inner inductive coil are inductively coupled and separated by the conductive barrier. Power and data signals are transmitted from the outer inductive coil, through the conductive barrier, to the inner inductive coil. The inner inductive coil is coupled to a wireless hub, which wirelessly provides power and data signals to a liquid quantity measurement assembly that is configured to determine the liquid quantity of the liquid stored in the conductive enclosure.

It should be appreciated that the above-described subject matter may also be implemented in various other embodiments without departing from the spirit of the disclosure. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
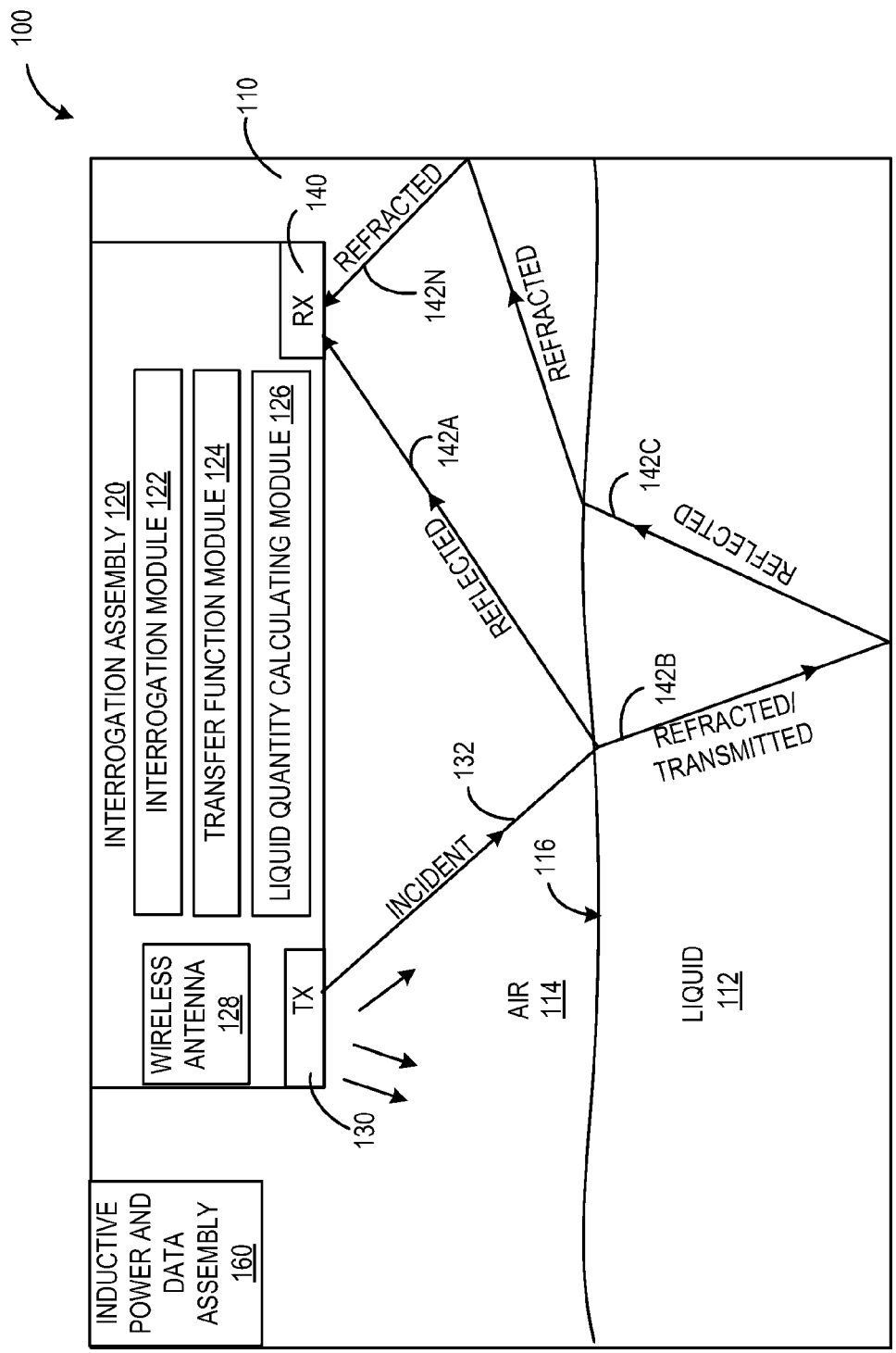
FIG. 1 is a diagram illustrating one implementation of wirelessly measuring liquid quantity in an enclosure, in accordance with some embodiments described herein.

Technologies are described herein for wirelessly measuring liquid quantity in an enclosure. As briefly described above, fuel stored in a fuel tank of an aircraft can be measured wirelessly using electromagnetic waves. In this manner, no wires may extend within the fuel tank, thereby eliminating the risk of a lightning current entering the fuel tank and improving overall aircraft safety.

Generally speaking, the present disclosure provides techniques for calculating liquid quantity by measuring a transfer function corresponding to electromagnetic waves being received within a conductive enclosure. According to embodiments, one or more incident electromagnetic waves are transmitted towards the air/liquid boundary. When incident electromagnetic waves interact with the air/liquid boundary, the incident electromagnetic waves may transmit through and/or reflect off of the air/liquid boundary due to an impedance mismatch at the air/liquid boundary. In this sense, the incident electromagnetic wave splits into its reflected and transmitted components. These reflected and transmitted components are also electromagnetic waves, which may then reflect off of the walls of the conductive enclosure. Each time an incident and/or component electromagnetic wave interacts with a boundary, whether it is air/liquid, air/wall, or liquid/wall, the electromagnetic wave undergoes a corresponding phase shift. Some, but not all of the initially launched incident electromagnetic waves arrive at the receiver, where the component waves corresponding to the incident electromagnetic waves coherently add. Due to the corresponding phase shifts of the component waves, which as described above, are dependent on the frequency of the electromagnetic wave and the geometry of the conductive enclosure and the liquid stored within the conductive enclosure, a unique response is obtained at the receiver.

The unique response obtained at the receiver antenna may be represented as a transfer function, which is derived from the coherent summation of the component waves. Transfer functions are highly dependent on geometry. The air/liquid boundary in the conductive enclosure acts as a continuously varying boundary, which affects the transfer function. Changes in the transfer function indicate a change in the position of the air/liquid boundary, which is essentially a change in the liquid quantity. Accordingly, by measuring changes in the transfer function, liquid quantity stored in the conductive enclosure can be calculated.

According to some embodiments, incident electromagnetic waves may be transmitted towards the air/liquid boundary at a number of discrete frequencies over a specific bandwidth. The incident electromagnetic waves may be scattered upon interacting with the air/liquid boundary, thereby producing corresponding reflected and transmitted component waves. The scattered component waves may eventually be received by the receiver and coherently added, resulting in the measurement of a transfer function. It should be understood that based on the geometry of the air/liquid boundary, the characteristics of the components waves may vary. Accordingly, as the geometry of the air/liquid boundary changes, the characteristics of the component waves vary such that when the component waves are coherently added, a transfer function may be obtained that is unique to the particular geometry of the air/liquid boundary. In this way, by measuring the transfer function, the liquid quantity can be calculated.

In alternate embodiments, an incident electromagnetic wave may be transmitted towards the air/liquid boundary and a dominant reflected electromagnetic wave corresponding to the incident electromagnetic wave may be received after a time delay. This time delay corresponds to the time taken for the incident electromagnetic wave to interact with the air/liquid boundary and produce a dominant reflected component wave that is received at the receiver. The distance between a transceiver transmitting the incident electromagnetic wave and receiving the corresponding reflected component wave, and the surface of the liquid affects the time delay. Using frequency or time domain reflectometry, a transfer function corresponding to the time delay between the incident electromagnetic wave being transmitted by the transceiver and the reflected component wave being received is measured. By measuring the time delay, the quantity of liquid stored in the enclosure can be calculated.

In the following detailed description, references are made to the accompanying drawings that form a part hereof, and that show by way of illustration, specific embodiments or examples. Referring now to the drawings, in which like numerals represent like elements through the several figures, technologies for wirelessly measuring liquid quantity in an enclosure according to the various embodiments will be described.

FIG. 1 is a diagram illustrating one implementation for wirelessly measuring liquid quantity in an enclosure, in accordance with some embodiments described herein. In particular, FIG. 1 shows a cavity environment 100 that includes a conductive enclosure 110 for storing a liquid 112. The conductive enclosure 110 is made from materials that conduct electromagnetic waves. In this way, electromagnetic waves that are transmitted within the conductive enclosure are rebounded off of the surfaces of the conductive enclosure. Examples of such materials include, but are not limited to, metals and carbon fiber reinforced plastic (CFRP). According to one implementation, the conductive enclosure 110 is an aircraft fuel tank that is configured to store fuel. It should be appreciated that the remaining volume of the conductive enclosure 110 may be occupied by air 114. Further, an air/liquid boundary 116 may exist at a surface of the liquid 112 that is exposed to the air 114.

According to embodiments, the cavity environment 100 may include an interrogation assembly 120 that may be configured to continuously or periodically determine the quantity of liquid stored in the conductive enclosure 110. According to embodiments, the interrogation assembly 120 may include a wireless transmitter 130, a wireless receiver 140, an interrogation module 122, a transfer function module 124, a liquid quantity calculating module 126, and a wireless antenna 128. According to embodiments, the interrogation assembly 120 may be located within the conductive enclosure 110 or outside of the conductive enclosure 110. In some embodiments, only the transmitter 130, the wireless receiver 140, and the wireless antenna 128 may be positioned within the conductive enclosure 110, while one or more of the interrogation module 122, the transfer function module 124 and the liquid quantity calculating module 126 may be located outside of the conductive enclosure 110. In this way, all of the processing that may occur to determine the calculated liquid quantity may be performed by a computer that may be remotely located but in communication with the wireless transmitter 130 and the wireless receiver 140 via the wireless antenna 128. However, as shown in FIG. 1, all of the components of the interrogation assembly 120 may be positioned within the conductive enclosure 110.

In various implementations, the interrogation assembly 120 may be configured to continuously determine the quantity of liquid stored in the conductive enclosure 110 or alternately, be configured to determine the quantity of liquid stored in the conductive enclosure 110 upon receiving a request. In some embodiments, the interrogation assembly 120 may receive a request via the wireless antenna 128. In any event, when the interrogation assembly 120 is to determine the quantity of liquid stored in the conductive enclosure 110, the interrogation module 122 may be configured to send a control signal to the transmitter 130 to transmit incident electromagnetic waves within the conductive enclosure.

The transmitter 130 may be configured to transmit incident electromagnetic waves that interact with the air/liquid boundary 116 and the conductive enclosure 110. According to some embodiments, the interrogation module 122 may cause the transmitter 130 to transmit incident electromagnetic waves towards the air/liquid boundary 116 at a number of discrete frequencies over a specific bandwidth. Alternately, the interrogation module 122 may cause the transmitter 130 to transmit multiple identical incident electromagnetic waves towards the air/liquid boundary 116 having the same wave characteristics for redundancy purposes.

The incident electromagnetic waves 132 may be split into reflected, transmitted, and refracted component waves upon interacting with the air/liquid boundary. According to one example embodiment shown in FIG. 1, the incident electromagnetic wave 132 may be split into a reflected component wave 142A, a transmitted wave 142B, a refracted wave 142C, and a reflected wave 142N, amongst others, which are generally referred to as component waves 142. As a result, the interaction of the incident electromagnetic wave 132 with the air/liquid boundary 116 may create multiple combinations of component waves 142, which may eventually make their way to the receiver 140. The receiver 140 may be configured to receive the multiple component waves 142 and coherently add them at the receiver 140. It should be appreciated that reflected, transmitted and refracted component electromagnetic waves 142 may generally be referred to herein as rebound electromagnetic waves 142.

According to embodiments, the incident electromagnetic wave 132 may have particular wave characteristics, such as a particular amplitude, frequency and phase. The rebound electromagnetic waves 142 corresponding to the incident electromagnetic wave 132 also have corresponding wave characteristics that may change based on the quantity of liquid stored within the conductive enclosure 110. This is because the level of the liquid changes as the liquid quantity changes. As the liquid quantity changes, so does the relative phase and amplitude of all the rebound electromagnetic waves 142 being received by the receiver 140. Thus as the liquid quantity changes, the transfer function measured at the receiver 140 also changes, providing a unique transfer function corresponding to a particular liquid quantity.

According to the implementation shown in FIG. 1, the receiver 140 may be configured to receive the rebound electromagnetic waves 142 corresponding to the incident electromagnetic waves 132 that are directed towards the receiver 140. The rebound electromagnetic waves 142 are then provided to the transfer function module 124. The transfer function module 124 may receive the multiple rebound electromagnetic waves 142 from the receiver 140. The transfer function module 124 may further be configured to measure a transfer function, which may be unique for a particular liquid quantity.

It should be appreciated that the rebound electromagnetic waves 142 may vary based on the geometry of the conductive enclosure 110. In particular, at different liquid depths, the air/liquid boundary 116 may cause the incident electromagnetic waves 132 to reflect and/or refract differently. As such, the characteristics of the rebound electromagnetic waves 142 will vary with changes in liquid depths. In this way, the rebound electromagnetic waves 142 that are received by the receiver 142 will have characteristics that were affected by the depth of the liquid.

As mentioned above, the transfer function module 124 may measure a transfer function by coherently adding the component electromagnetic waves 142A and 142B. In some embodiments, the transfer function module 124 may be configured to construct a received power profile representing the coherent summation of rebound electromagnetic waves. The received power profile may be constructed over a range of frequencies at which the incident electromagnetic waves 132 are transmitted within the conductive enclosure 110. The transfer function module 124 may then correlate the received power profile to a corresponding transfer function, which is then measured by the transfer function module 124. According to embodiments, the transfer function may be measured in the frequency or time domain. Upon measuring the transfer function, the transfer function module 124 provides the measured transfer function to the liquid quantity calculating module 126, which then calculates the liquid quantity based on the measured transfer function.

According to embodiments, the liquid quantity calculating module 126 may calculate the liquid quantity from the measured transfer function by utilizing a set of data points, such as a set of known time delays that were previously determined through a calibration process. In the calibration process, incident electromagnetic waves, such as the incident electromagnetic wave 132 having particular wave characteristics, are transmitted and a corresponding transfer function measured at the receiver 140 is recorded for a first liquid quantity. The calibration process is repeated for different liquid quantities until a large set of data points are determined for a range of liquid quantities.

Further, due to the various factors that may affect the transfer functions, multiple incident electromagnetic waves 132 may be transmitted at each liquid quantity. In this way, data points that are inconsistent with the majority may be ignored. Once the cavity environment 100 is calibrated over a wide range of liquid quantity levels, the calibration data is stored and made available to the liquid quantity calculating module 126. Accordingly, during operation, the actual liquid quantity of the conductive enclosure 110 can be calculated by comparing the measured transfer function with the calibrated set of liquid quantity levels. Upon determining that the transfer function measured at the receiver 140 matches or is similar to a transfer function corresponding to an entry in the calibrated set of liquid levels, the liquid quantity corresponding to the matched transfer function is determined.

The cavity environment 100 may also include an inductive power and data assembly 160, which may be configured to wirelessly receive power from outside the conductive enclosure 110. According to embodiments, the inductive power and data assembly 160 may be configured to provide power and data signals to the interrogation assembly 120 wirelessly. In some implementations, the wireless antenna 128 of the interrogation assembly may be configured to wirelessly communicate with the inductive power and data assembly 160. According to embodiments, the data signals may include requests to wirelessly measure the liquid quantity of the conductive enclosure 110. Additional details regarding the inductive power and data assembly will be provided herein with respect to FIGS. 3 and 4.

Figure 2:
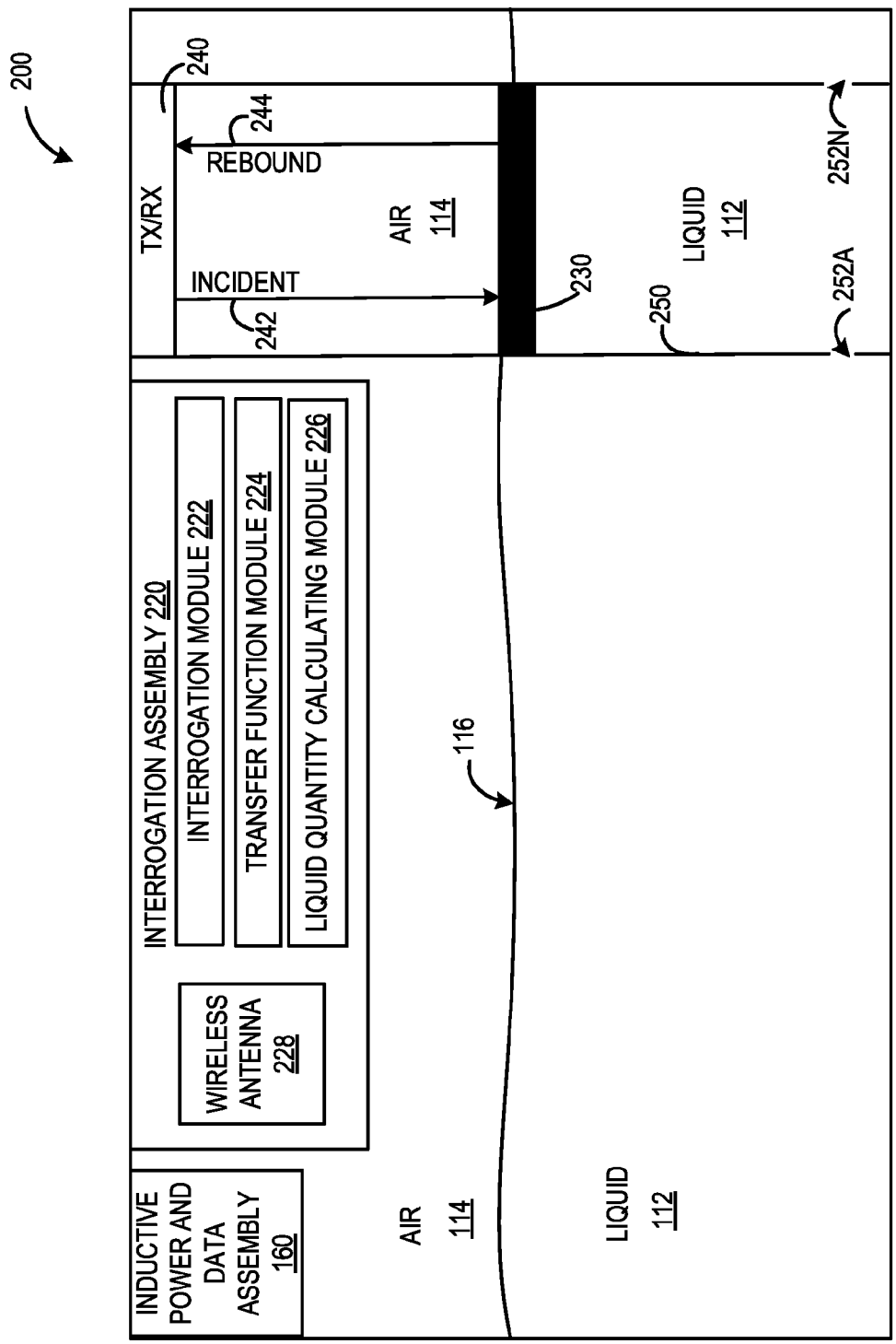
FIG. 2 is a diagram illustrating another implementation of wirelessly measuring liquid quantity in an enclosure, in accordance with some embodiments described herein.

Referring now to FIG. 2, a diagram illustrating another implementation for wirelessly measuring liquid quantity in an enclosure is shown. In particular, FIG. 2 shows a slotted waveguide environment 200, which has a similar configuration to the cavity environment 100. The slotted waveguide environment 200 may include the conductive enclosure 110 that may include the liquid 112. Space not occupied by the liquid may be occupied by air 114. Moreover, the air/liquid boundary 116 may exist at the surface of the liquid 112 that is exposed to the air 114.

Unlike the cavity environment 100, the slotted waveguide environment 200 may include a slotted waveguide 250. A waveguide may be any structure configured to guide electromagnetic waves. An example of a waveguide may be a hollow metal tube. A slotted waveguide is a waveguide that has one or more slots positioned such that when the slotted waveguide is positioned in an enclosure, such as the conductive enclosure 110, the liquid stored in the enclosure may enter the slotted waveguide. In the implementation shown in FIG. 2, the slotted waveguide 250 is configured to allow the liquid 112 to enter the slotted waveguide 250 and assume a liquid depth level that is equal to the liquid depth level of the liquid surrounding the slotted waveguide 250.

Similar to the cavity environment 100, the slotted waveguide environment 200 may also include an interrogation assembly 220 that is similar to the interrogation assembly 120. The interrogation assembly 220 may also include the interrogation module 222, which operates similar to the interrogation module 122. The interrogation assembly 220 may cause the transceiver 240 to transmit incident electromagnetic waves 242 towards the air/liquid boundary 116. The transceiver 240 may receive the rebound electromagnetic waves 244 corresponding to the incident electromagnetic waves 242.

In addition, the interrogation assembly 220 may also include a transfer function module 224 that is configured to determine a transfer function corresponding to the received electromagnetic waves. As the liquid depth level changes, the distance between the transceiver 240 and the air/liquid boundary 116 also changes. Accordingly, the liquid quantity may be calculated by determining a transfer function that corresponds to the travel time taken for the incident electromagnetic wave 242 to reflect off the air/liquid boundary and be received by the transceiver 240. According to embodiments, the travel time may be represented as a transfer function and may correspond to a particular distance between the transceiver 240 and the air/liquid boundary 116. Upon determining the distance between the transceiver 240 and the air/liquid boundary 116, the liquid quantity can be calculated.

In order to determine the liquid quantity from the travel time, the slotted waveguide environment 200 may be calibrated. In the calibration process, the travel time for an incident electromagnetic wave, such as the incident electromagnetic wave 242 to be transmitted and received as a rebound electromagnetic wave 244 may be determined for a large set of liquid levels ranging from a liquid level corresponding to an empty tank to a liquid level corresponding to a full tank.

Once the slotted waveguide environment 200 is calibrated over a wide range of liquid quantities, the actual liquid quantity of the conductive enclosure 110 is determined by comparing the measured transfer function with the calibrated set of liquid quantities. Upon determining that a transfer function measured at the receiver 140 matches or is similar to a transfer function corresponding to the calibrated set of liquid quantities, the liquid quantity corresponding to the matched known transfer function is calculated.

According to some embodiments, a reflective float 230, such as a metallic float may be positioned within the slotted waveguide such that the reflective float 230 floats on the air/liquid boundary 116. The reflective float 230 may be configured to increase the sensitivity of the slotted waveguide environment by providing a reflective surface from which the incident electromagnetic wave 242 may reflect back to the transceiver 240 while increasing the intensity of the electromagnetic wave reflected back to the transceiver 240.

In addition, the slotted waveguide environment 200 may also include the inductive power and data assembly 160. As described above, the inductive power and data assembly 160 may be configured to provide power and data signals to the interrogation assembly 220 wirelessly.

Figure 3:
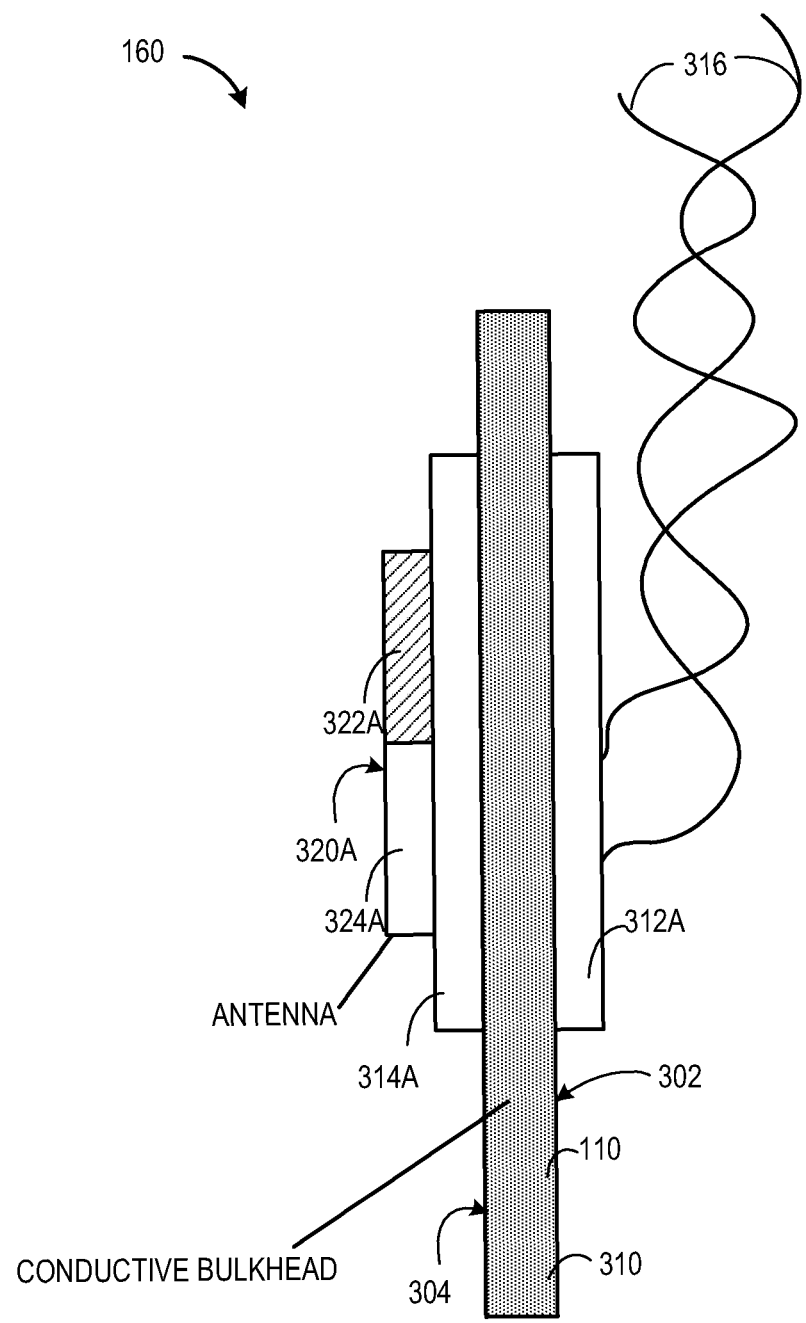
FIG. 3 is a diagram illustrating one implementation for wirelessly transmitting power into an enclosure, in accordance with some embodiments described herein.

FIG. 3 is a diagram illustrating one implementation for wirelessly transmitting power into an enclosure, in accordance with some embodiments described herein. In particular, FIG. 3 shows an inductive power and data assembly 160 configured to wirelessly transmit power and data from outside the conductive enclosure 110 to within the conductive enclosure 110.

The inductive power and data assembly 160 may include an outer inductive coil 312A that may be attached to an outer wall 302 of a portion of the conductive enclosure 110 and an inner inductive coil 314A that may be attached to an inner wall 304 of the portion of the conductive enclosure 110. The portion of the conductive enclosure 110 may be a conductive barrier 310, such as a metal, CFRP, or a material configured to conduct electromagnetic waves. It should be appreciated that a metal conductive barrier may be treated to minimize the effects of eddy currents that may adversely affect the transfer of electromagnetic fields across the surface. The outer inductive coil 312A and the inner inductive coil 314A may be inductively coupled such that power and data being supplied to the outer inductive coil 312A through wires 316 may be induced across the inner inductive coil 314A through the conductive barrier 310. It should be appreciated that the induced power and data signals may be induced at low frequencies. By selecting lower frequencies of operation, such as frequencies in the lower MHz range, power and data signals may be transmitted through the conductive barrier 310 to the inner inductive coil 314A.

A wireless hub 320A may be coupled to the inner inductive coil 314A inside the conductive enclosure 110. The wireless hub 320A may include electronics 322A, including a rectification circuit for rectifying and storing the induced power. Further, the electronics 322A may include a down-up converter that may be configured to convert the low frequency induced signals at the inner inductive coil 314A to higher frequency radio frequency (RF) microwaves. One reason for upconverting the low frequency induced signal to a higher frequency RF carrier signal may be to propagate the power and data signals to various components, such as the interrogation assembly 220 within the conductive enclosure 110.

Figure 4:
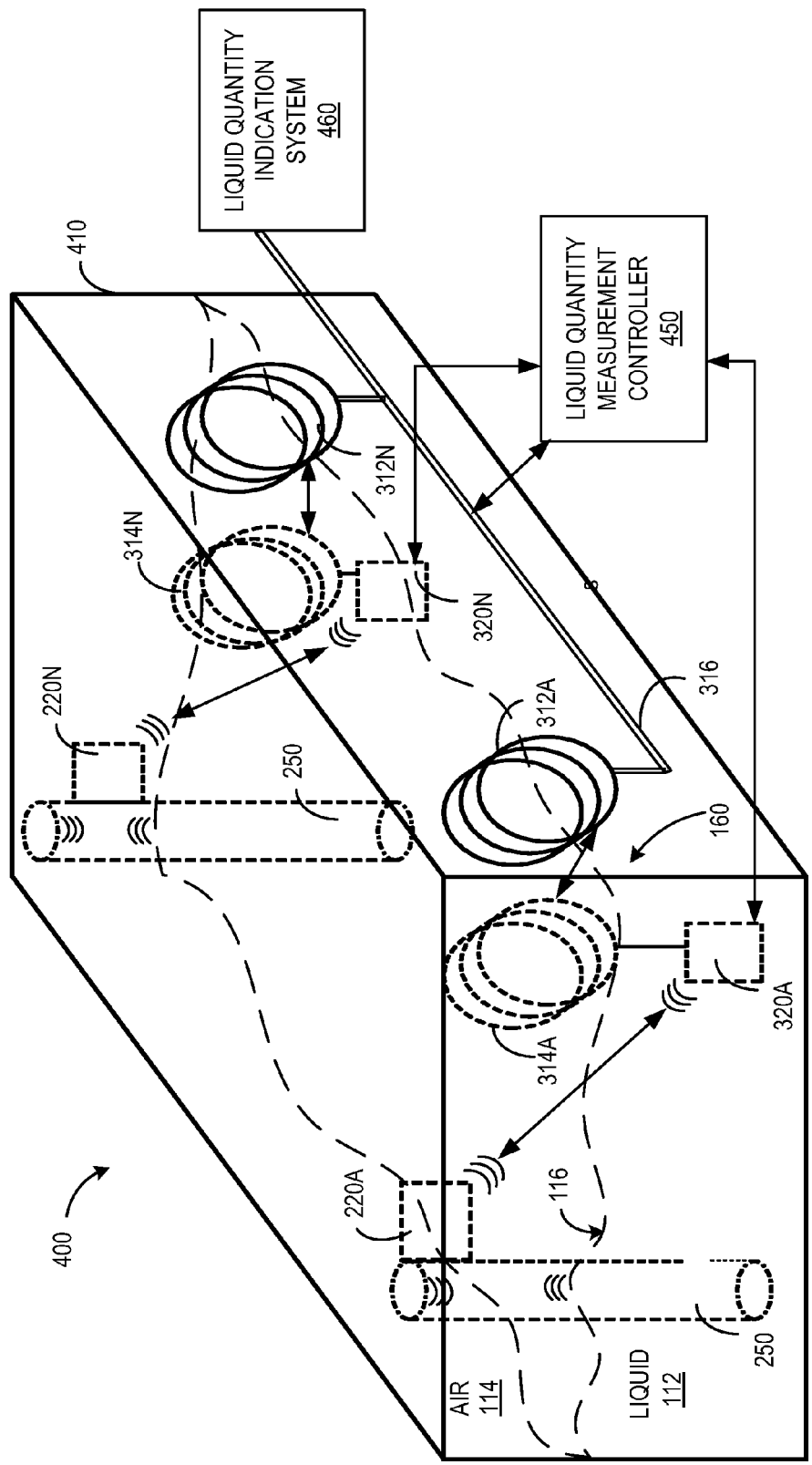
FIG. 4 is a perspective diagram illustrating one view of the implementation shown in FIG. 2, in accordance with some embodiments described herein.

Referring now to FIG. 4, a perspective diagram illustrating one view of the implementation shown in FIG. 2 is described herein. In particular, a wireless liquid quantity measuring system 400 may include a conductive enclosure 410, similar to the conductive enclosure 110. According to embodiments, the wireless liquid quantity measuring system 400 may include multiple slotted interrogation assemblies 220A, 220N communicating wirelessly with respective inductive power and data assemblies 320A, 320N, generally referred to herein as an inductive power and data assembly 320. Each inductive power and data assembly 320 may include a pair of inductively coupled induction coils. The pair of inductively coupled induction coils may include an outer induction coil, such as the outer induction coils 312A, 312N that may be attached to the outer wall of the conductive enclosure 410. Moreover, the pair of inductively coupled induction coils may also include an inner induction coil, such as the inner induction coils 314A, 314N that may be attached to the inner wall of the conductive enclosure 410 in such a way that the outer induction coil 312A, 312N is inductively coupled to the respective inner induction coil 314A, 314N. In this way, power and data signals may be transmitted from within the conductive enclosure 410 to outside the conductive enclosure 410 and vice versa without the use of any wires extending within the conductive enclosure 410.

In addition, the wireless liquid quantity measuring system 400 may also include the interrogation assemblies 220A, 220N, generally referred to herein as interrogation assembly 220. Each interrogation assembly 220 may be configured to calculate the liquid quantity within a respective slotted waveguide 250 to which the interrogation assembly 220 is communicatively coupled. As described above with respect to FIG. 2, the interrogation assembly 220A may include the transceiver 240, which may be configured to transmit incident electromagnetic waves towards the air/liquid boundary 116 within the slotted waveguide 250 and receive rebound electromagnetic waves corresponding to the incident electromagnetic waves. The interrogation assembly 220 may further include the interrogation module 222 that is configured to cause the transceiver 240 to transmit interrogation signals, such as incident electromagnetic waves within the slotted waveguide 250. The interrogation module 222 may further be configured to cause the transceiver 240 to receive the interrogation signals, such as the reflected electromagnetic waves and measure a transfer function corresponding to the travel time for an incident electromagnetic wave to reflect off the air/liquid boundary 116 and be received by the transceiver 240. Once the rebound electromagnetic waves are received by the receiver, the transfer function module 224 of the interrogation assembly 220 may measure a transfer function corresponding to the received rebound electromagnetic waves. Once the transfer function module 224 has measured the transfer function, the liquid quantity calculation module 226 may calculate the liquid quantity based on the measured transfer function by comparing the travel time to a set of calibrated data points. Once the liquid quantity is calculated by the liquid quantity calculation module 226, the interrogation assembly 220 may send a RF data signal to a respective inductive power and data assembly, such as the inductive power and data assembly 160 indicating the calculated liquid quantity data.

As described above with respect to FIG. 3, the inductive power and data assembly 160 may include a wireless hub, such as the wireless hub 320A, which may be configured to receive the calculated liquid quantity data from the interrogation assembly 220A. In addition, a second wireless hub 320N may be configured to communicate with another interrogation assembly, including the interrogation assembly 220N. In alternate embodiments, the wireless hub 320A may be configured to communicate with multiple interrogation assemblies 220. Upon receiving the calculated liquid quantity data, the wireless hub 320A may cause the up-down converter of the inductive data and power assembly 160 to convert the RF data signal to a low frequency signal. Once the RF data signal is converted to a low frequency signal, the wireless hub 320A may cause the inner inductive coil 314A to transmit the low frequency signal to the outer inductive coil 312A, from where the low frequency signal containing the liquid quantity data may be transmitted to a liquid quantity measurement controller 450.

It should be appreciated that the functionality of the interrogation assembly 220N may be identical to the functionality of the interrogation assembly 220A. By trying to determine the liquid quantity at multiple places within the conductive enclosure 410, a more accurate reading of the liquid quantity may be determined. This may be particularly useful in applications where the liquid may not be stationary. For instance, the conductive enclosure 410 may be a fuel tank of an aircraft. During flight, the fuel may move around causing ripples at the fuel/air boundary. In such situations, measuring the fuel quantity at multiple locations within the fuel tank may reduce the possibility of calculating the fuel quantity incorrectly.

In addition, the liquid quantity measurement controller 450 may be configured to communicate with the interrogation assemblies 220 within the conductive enclosure 410. In particular, the liquid quantity measurement controller 450 may be configured to transmit power from outside the conductive enclosure 410 to the components within the conductive enclosure 410 via the inductively coupled induction coils, such as the induction coils 312A, 312N, 314A, 314N. Moreover, the liquid quantity measurement controller 450 may also be able to provide data signals that may include control signals indicating requests to calculate liquid quantities. The wireless liquid measurement controller 450 may be able to send individual power signals and/or control signals to particular interrogation assemblies 220. Further, the liquid quantity measurement controller 450 may also receive data signals including liquid quantity data indicating the quantity of liquid within each of the slotted waveguides 250. It should be appreciated that the liquid quantity measurement controller 450 may also be implemented in a wireless liquid quantity measuring system that may utilize the cavity environment 100, which is described above with respect to FIG. 1, for measuring liquid quantity within conductive enclosure, such as the conductive enclosure 110. In some embodiments, the liquid quantity measurement controller 450 may communicate liquid quantity measurement data with a liquid quantity indication system 460 that may be responsible for displaying the amount of liquid stored in the enclosure 410. In aircraft implementations, the liquid quantity indication system 460 may be a fuel quantity indication system utilized to calculate and display the amount of fuel stored in the fuel tanks of the aircraft. According to some embodiments, the fuel quantity indication system may be in the aircraft electrical equipment (EE) bay.

Figure 5:
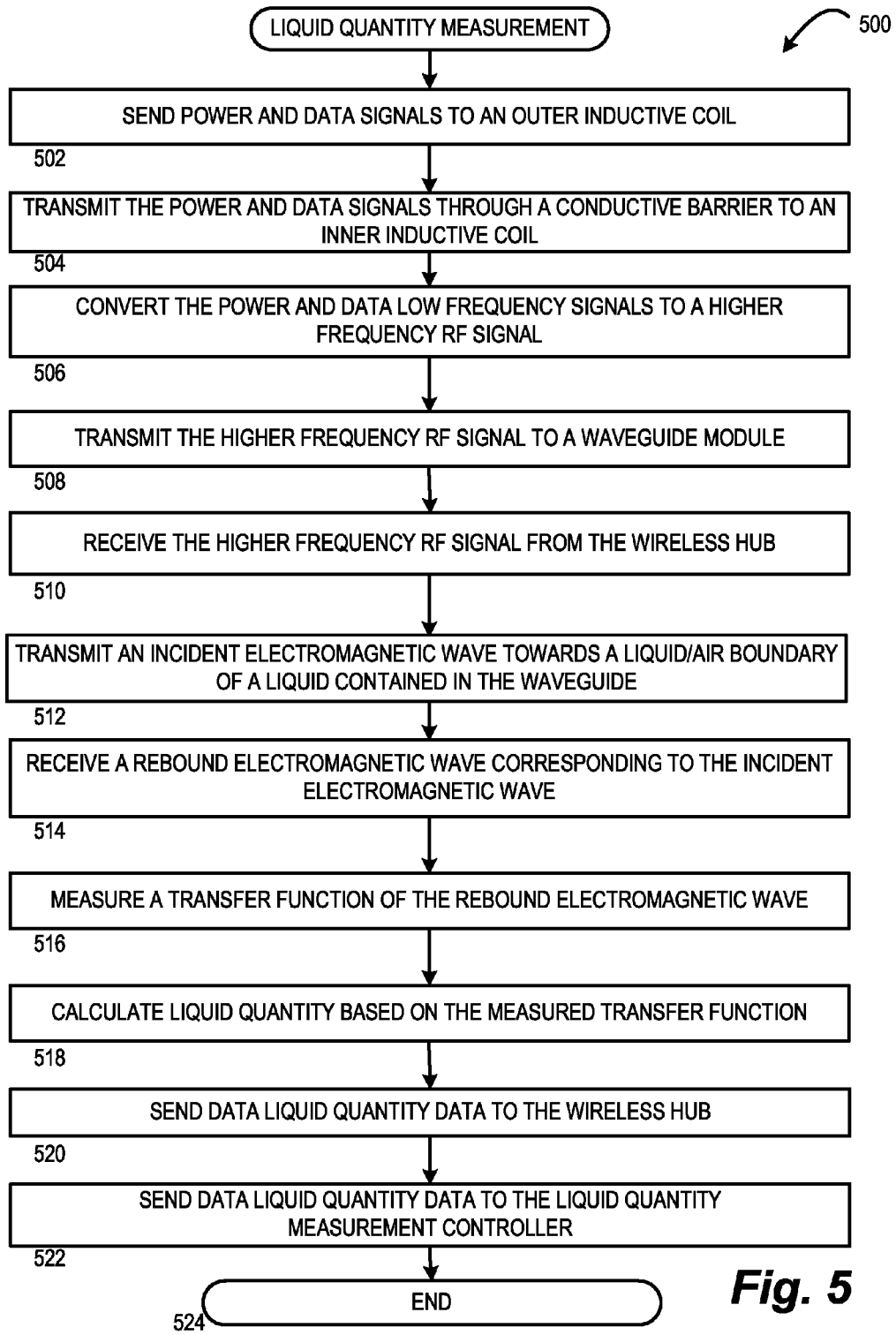
FIG. 5 is a flow diagram illustrating a process of wirelessly measuring liquid quantity in an enclosure, in accordance with some embodiments described herein.

FIG. 5 is a flow diagram illustrating a process of wirelessly measuring liquid quantity in an enclosure, in accordance with some embodiments. It should be appreciated that the logical operations described herein may be performed by specifically programmed computing devices and/or analog or digital circuitry depending on the implementation. It should also be appreciated that more or fewer operations may be performed than shown in the figures and described herein. These operations may also be performed in a different order than those described herein.

Routine 500 begins at operation 502, where the liquid quantity measurement controller 410 may send power and data signals to an outer inductive coil 312A. The power and data signals may be sent to the outer inductive coil 312A via wires 316. According to embodiments, the power and data signals may be low frequency signals so that the power and data signals may be transmitted through the conductive enclosure 110. From operation 502, the routine 500 proceeds to operation 504, where the power and data signals are transmitted through the conductive barrier to an inner inductive coil. The conductive barrier may be a bulkhead of the conductive enclosure 110 and may be made from any material capable of conducting electromagnetic waves. For instance, the conductive barrier 310 may be made from a metal or CFRP material.

From operation 504, the routine 500 proceeds to operation 506, where the wireless hub 320A may convert the induced power and data signals to a higher frequency RF signal. According to embodiments, the induced power and data signals are converted to microwave frequencies. From operation 506, the routine 500 proceeds to operation 508, where the wireless hub 320A transmits the converted higher frequency RF signal to the interrogation assembly 220A. From operation 508, the routine 500 proceeds to operation 510, where the interrogation assembly 220A receives the converted higher frequency RF signal from the wireless hub 320A.

From operation 510, the routine 500 proceeds to operation 512, where in response to receiving the converted higher frequency RF signal, the interrogation assembly 220 causes the transceiver 240 to transmit an incident electromagnetic wave towards the air/liquid boundary 116 of the liquid 112 contained in the slotted waveguide 250. According to embodiments, the slotted waveguide 250 may include a reflective float 230 configured to increase the sensitivity for reflecting incident electromagnetic waves. From operation 512, the routine 500 proceeds to operation 514, where the transceiver 240 receives rebound electromagnetic waves corresponding to the incident electromagnetic waves. According to embodiments, the rebound electromagnetic waves may include multiple component reflected electromagnetic waves that will coherently add at the transceiver. In some embodiments, the transceiver 240 may be configured to only receive single-component reflected electromagnetic waves.

From operation 514, the routine 500 proceeds to operation 516, where the transfer function module 224 measures a transfer function of the rebound electromagnetic wave. According to embodiments, the interrogation module 222 of the interrogation assembly 220 may be configured to measure the transfer function. According to embodiments, the transfer function may be the travel time for an incident electromagnetic wave to be received by the transceiver 240. The measured travel time may correspond to a particular distance between the transceiver 240 and the air/liquid boundary 116. From operation 516, the routine 500 proceeds to operation 518, where the liquid quantity calculating module 226 calculates the liquid quantity based on the measured transfer function. Upon determining that the transfer function measured at the transceiver 240 matches or is similar to a transfer function corresponding to the calibrated set of liquid quantities, the liquid quantity corresponding to the matched known transfer function is calculated. In one embodiment, the transfer function may correspond to a time delay between transmitting an incident electromagnetic wave and receiving a rebound electromagnetic wave corresponding to the incident electromagnetic wave. Once the transfer function corresponding to the time delay is measured, the liquid quantity may be calculated by comparing the transfer function to a set of known time delays corresponding to an incident electromagnetic wave having the same characteristics as the transmitted incident electromagnetic wave.

From operation 518, the routine 500 proceeds to operation 520, where the calculated liquid quantity is sent to the wireless hub via a RF high frequency signal. From operation 520, the routine 500 proceeds to operation 522, where upon receiving the liquid quantity data from the interrogation assembly 220, the wireless hub 320A sends the liquid quantity data to the liquid quantity measurement controller 450. According to embodiments, the liquid quantity data may be sent to the liquid quantity measurement controller 450 by transmitting a low frequency signal from the inner inductive coil through the conductive barrier 410 to the outer inductive coil. From operation 522, the routine 500 ends at operation 524.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for measuring liquid quantity, comprising:
   transmitting, by a transmitter, one or more incident electromagnetic waves within a conductive enclosure;
   receiving rebound electromagnetic waves corresponding to the incident electromagnetic waves;
   measuring a transfer function corresponding to the rebound electromagnetic waves; and
   calculating liquid quantity based on the measured transfer function by
      determining a time delay between transmitting a particular incident electromagnetic wave of the incident electromagnetic waves and receiving a corresponding rebound electromagnetic wave,
      comparing the time delay to a set of known time delays corresponding to an incident electromagnetic wave having the same characteristics as the particular incident electromagnetic wave,
      determining if the time delay matches one of the set of known time delays, and
      upon determining that the time delay matches a time delay of the set of know time delays, determining a liquid quantity corresponding to the matched time delay.

2. The method of claim 1, wherein transmitting the one or more incident electromagnetic waves within the conductive enclosure comprises transmitting the one or more incident electromagnetic waves towards a surface of a liquid stored within the conductive enclosure.

3. The method of claim 1, wherein the incident electromagnetic waves are transmitted towards a reflective float floating on a surface of a liquid stored within the enclosure.

4. The method of claim 1, wherein receiving rebound electromagnetic waves comprises receiving reflected electromagnetic waves that is a reflection of the incident electromagnetic waves.

5. The method of claim 1, wherein the incident electromagnetic waves are transmitted at a number of discrete frequencies over a specific bandwidth; and
   wherein measuring a transfer function corresponding to the rebound electromagnetic waves comprises constructing a received power profile representing the coherent summation of rebound electromagnetic waves.

6. The method of claim 1, further comprising:
   transmitting a first radio frequency (RF) signal comprising liquid quantity data corresponding to the calculated liquid quantity to a wireless hub configured to relay the liquid quantity data to a liquid quantity measurement controller outside the conductive enclosure; and
   relaying the liquid quantity data to the liquid quantity measuring controller.

7. The method of claim 1, wherein relaying the liquid quantity data to the liquid quantity measuring controller comprises:
   generating a liquid quantity signal containing the liquid quantity data;
   passing the liquid quantity signal to an inner inductive coil attached to an inner surface of the conductive enclosure;
   transmitting the liquid quantity signal to an outer inductive coil that is inductively coupled to the inner inductive coil; and
   receiving the liquid quantity signal at the outer inductive coil; and
   passing the liquid quantity signal to the liquid quantity measurement controller.

8. A wireless liquid quantity measuring system, comprising:
   an interrogation assembly comprising
      a transmitter configured to transmit one or more incident electromagnetic waves within a conductive enclosure configured to store a liquid,
      a receiver configured to receive rebound electromagnetic waves corresponding to the incident electromagnetic waves,
      a transfer function module configured to measure a transfer function corresponding to the rebound electromagnetic waves, and a liquid quantity calculating module configured to calculate liquid quantity based on the measured transfer function; and a slotted waveguide positioned within the conductive enclosure; and wherein the transmitter is configured to transmit the one or more incident electromagnetic waves within the slotted waveguide.

9. The wireless liquid quantity measuring system of claim 8, further comprising a reflective float configured to float on a surface of the liquid within the slotted waveguide and to reflect the incident electromagnetic waves.

10. The wireless liquid quantity measuring system of claim 8, wherein the liquid quantity calculating module is further configured to:
    determine a time delay between transmitting a particular incident electromagnetic wave of the incident electromagnetic waves and receiving a corresponding rebound electromagnetic wave;
    compare the determined time delay to a set of known time delays corresponding to an incident electromagnetic wave having the same characteristics as the particular incident electromagnetic wave;
    determine if the time delay matches one of the set of known time delays; and
    upon determining that the time delay matches a time delay of the set of known time delays, determine a liquid quantity corresponding to the matched time delay.

11. The wireless liquid quantity measuring system of claim 8, further comprising an inductive power and data assembly configured to transmit power and data signals to the interrogation assembly, and wherein the interrogation assembly further comprises a wireless antenna configured to transmit a first wireless signal comprising liquid quantity data corresponding to the calculated liquid quantity to the inductive power and data assembly.

12. The wireless liquid quantity measuring system of claim 11, wherein the inductive power and data assembly comprises:
    a pair of inductively coupled inductive coils including an inner inductive coil and an outer inductive coil separated by the conductive enclosure configured to conducting electromagnetic waves, the inner inductive coil attached to an inner surface of the conductive enclosure and the outer inductive coil attached to an outer surface of the conductive enclosure; and
    a wireless hub comprising
        a down-up frequency converter configured to convert low frequency inductive signals received at the inner inductive coil to higher frequency RF signals,
        a up-down frequency converter configured to convert higher frequency RF signals received from the interrogation assembly to a low frequency inductive signals, and
        a second wireless antenna configured to communicate with the first wireless antenna of the interrogation assembly via the higher frequency RF signals.

13. The wireless liquid quantity measuring system of claim 8, wherein the conductive enclosure comprises carbon fiber reinforcement plastic (CFRP).

14. A system, comprising:
    a conductive enclosure;
    an interrogation assembly disposed within the conductive enclosure that calculates a liquid quantity of a liquid stored in the conductive enclosure; and
    an inductive power and data assembly configured to wirelessly supply power to the interrogation assembly and communicate data signals between the interrogation assembly and the inductive power and data assembly, the inductive power and data assembly comprising a pair of inductively coupled inductive coils including an inner inductive coil and an outer inductive coil separated by the conductive enclosure capable of conducting electromagnetic waves, the inner inductive coil attached to an inner surface of the conductive enclosure and the outer inductive coil attached to an outer surface of the conductive enclosure,
    wherein the calculated liquid quantity of the liquid stored in the conductive enclosure being wirelessly communicated through the data signals between the interrogation assembly and the inductive power and data assembly.

15. The system of claim 14, wherein the interrogation assembly comprises:
    a transmitter configured to transmit one or more incident electromagnetic waves within a conductive enclosure configured to store a liquid,
    a receiver configured to receive rebound electromagnetic waves corresponding to the incident electromagnetic waves,
    a transfer function module configured to measure a transfer function corresponding to the rebound electromagnetic waves, and
    a liquid quantity calculating module configured to calculate liquid quantity based on the measured transfer function.

16. The system of claim 15, wherein the liquid quantity calculating module is further configured to:
    determine a time delay between transmitting a particular incident electromagnetic wave of the incident electromagnetic waves and receiving a corresponding rebound electromagnetic wave;
    compare the determined time delay to a set of known time delays corresponding to an incident electromagnetic wave having the same characteristics as the particular incident electromagnetic wave;
    determine if the determined time delay matches one of the set of known time delays; and
    upon determining that the determined time delay matches a time delay of the set of known time delays, determine a liquid quantity corresponding to the matched time delay.

17. The system of claim 14, wherein the inductive power and data assembly further comprises a wireless hub configured to wirelessly communicate with the interrogation assembly; and
    wherein the interrogation assembly further comprises a wireless antenna for communicating with a wireless hub, the interrogation assembly configured to send data corresponding to the calculated liquid quantity to the wireless hub via the wireless antenna.

18. The system of claim 14, further comprising a slotted waveguide positioned within the conductive enclosure, wherein the transmitter is configured to transmit the incident electromagnetic waves towards the liquid within the slotted waveguide.

* * * * *